United States Patent
Brothers et al.

(10) Patent No.: US 10,417,555 B2
(45) Date of Patent: *Sep. 17, 2019

(54) DATA-OPTIMIZED NEURAL NETWORK TRAVERSAL

(71) Applicant: Samsung Electronics Co., Ltd., Gyeonggi-Do (KR)

(72) Inventors: John W. Brothers, Calistoga, CA (US); Joohoon Lee, East Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 515 days.

This patent is subject to a terminal disclaimer.

(21) Appl. No.: 15/148,627

(22) Filed: May 6, 2016

(65) Prior Publication Data

US 2016/0350645 A1 Dec. 1, 2016

Related U.S. Application Data

(60) Provisional application No. 62/168,489, filed on May 29, 2015.

(51) Int. Cl.
| | |
|---|---|
| *G06N 3/04* | (2006.01) |
| *G06N 3/10* | (2006.01) |
| *G06T 1/60* | (2006.01) |
| *G06N 3/08* | (2006.01) |

(52) U.S. Cl.
CPC ............ *G06N 3/04* (2013.01); *G06N 3/0454* (2013.01); *G06N 3/08* (2013.01); *G06N 3/10* (2013.01); *G06T 1/60* (2013.01)

(58) Field of Classification Search
CPC ...... G06N 3/049; G06N 3/082; G06F 17/3028
See application file for complete search history.

(56) References Cited

U.S. PATENT DOCUMENTS

| | | |
|---|---|---|
| 5,271,090 A | 12/1993 | Boser |
| 5,276,771 A | 1/1994 | Manukian et al. |
| 5,412,754 A | 5/1995 | Le Cun et al. |
| 5,825,907 A | 10/1998 | Russo |
| 6,278,799 B1 | 8/2001 | Hoffman |
| 6,549,646 B1 | 4/2003 | Yeh et al. |
| 6,650,779 B2 | 11/2003 | Vachtesvanos et al. |

(Continued)

OTHER PUBLICATIONS

Fergus, R. "Deep Convolutional Neural Networks for Image Classification," [online] University of Illinois at Urbana-Champaign, slide presentation, [retrieved May 6, 2016] retrieved from the Internet: <http://web.engr.illinois.edu/~slazebni/spring14/lec24_cnn.pdf>, 55 pg.

(Continued)

*Primary Examiner* — Vincent Gonzales
*Assistant Examiner* — Seth Andrew Raker
(74) *Attorney, Agent, or Firm* — Renaissance IP Law Group LLP

(57) ABSTRACT

Executing a neural network includes generating an output tile of a first layer of the neural network by processing an input tile to the first layer and storing the output tile of the first layer in an internal memory of a processor. An output tile of a second layer of the neural network can be generated using the processor by processing the output tile of the first layer stored in the internal memory.

20 Claims, 9 Drawing Sheets

(56) References Cited

U.S. PATENT DOCUMENTS

| | | | |
|---|---|---|---|
| 7,308,134 B2 | 12/2007 | Wersing et al. | |
| 7,548,892 B2 | 6/2009 | Buck et al. | |
| 7,634,137 B2 | 12/2009 | Simard et al. | |
| 9,390,369 B1* | 7/2016 | Sinyavskiy | G06N 3/049 |
| 2003/0061184 A1* | 3/2003 | Masgonty | G06N 3/0454 |
| | | | 706/15 |
| 2004/0078191 A1 | 4/2004 | Tian et al. | |
| 2007/0086655 A1 | 4/2007 | Simard et al. | |
| 2015/0032449 A1 | 1/2015 | Sainath et al. | |
| 2015/0036920 A1 | 2/2015 | Wu et al. | |
| 2016/0239706 A1* | 8/2016 | Dijkman | G06F 17/3028 |
| 2016/0342890 A1* | 11/2016 | Young | G06N 5/04 |

OTHER PUBLICATIONS

Chen, T. et al., "Diannao: A small-footprint high-throughput accelerator for ubiquitous machine-learning," In ACM Sigplan Notices, vol. 49, No. 4, pp. 269-284, ACM, 2014.
Chen, T. et al., "A High-Throughput Neural Network Accelerator," IEEE Micro, May 1, 2015, vol. 3, pp. 24-32.
Communication Pursuant to Article 94(3) EPC for EP Application No. 16171554.5 dated May 3, 2019 (7 pages).

* cited by examiner

| Tile 404 Compute Unit A | Tile 406 Compute Unit B | Tile 412 Compute Unit B | Tile 414 Compute Unit A |
|---|---|---|---|
| Tile 408 Compute Unit C | Tile 410 Compute Unit D | Tile 416 Compute Unit D | Tile 418 Compute Unit C |
| Tile 420 Compute Unit C | Tile 422 Compute Unit D | Tile 428 Compute Unit D | Tile 430 Compute Unit C |
| Tile 424 Compute Unit A | Tile 426 Compute Unit B | Tile 432 Compute Unit B | Tile 434 Compute Unit A |

402

440, 442, 444, 446

DATA-OPTIMIZED NEURAL NETWORK TRAVERSAL

CROSS-REFERENCE TO RELATED APPLICATIONS

This application claims the benefit of U.S. Provisional Patent Application No. 62/168,489 filed on May 29, 2015, which is fully incorporated herein by reference.

TECHNICAL FIELD

This disclosure relates to neural networks. More particularly, the disclosure relates to execution of a neural network.

BACKGROUND

Neural networks refer to a computational architecture modeled after biological brains. Within a neural network, nodes referred to as neurons may be interconnected and operate collectively to process complex input data. Examples of different types of neural networks include, but are not limited to, Convolutional Neural Networks, Recurrent Neural Networks, Deep Belief Networks, Restricted Boltzman Machines, etc. In a feed-forward neural network, the neurons of the neural network have links to other neurons. The links only extend in one direction, i.e., the forward direction, through the neural network.

A neural network may be used to extract "features" from complex input data. The neural network may include a plurality of layers. Each layer may receive input data and generate output data by processing the input data to the layer. The output data may be a feature map of the input data that the neural network generates by convolving an input image or a feature map with convolution kernels. Initial layers of a neural network, e.g., convolution layers, may be operative to extract low level features such as edges and/or gradients from an input such as an image. The initial layers of a neural network are also called feature extraction layers. Subsequent layers of the neural network, referred to as feature classification layers, may extract or detect progressively more complex features such as eyes, a nose, or the like. Feature classification layers are also referred to as "fully-connected layers."

External memory can be used to store a large amount of intermediate results data generated during execution of the neural network. External memory can also be used to store a large number of weights used in the feature classification layers.

SUMMARY

An embodiment includes a method of executing a neural network. The method includes generating an output tile of a first layer of the neural network by processing an input tile to the first layer and storing the output tile of the first layer in an internal memory of a processor. The method also includes generating, using the processor, an output tile of a second layer of the neural network by processing the output tile of the first layer stored in the internal memory.

Another embodiment includes an apparatus for executing a neural network. The apparatus includes an internal memory within a processor and a first compute unit, within the processor, coupled to the internal memory and configured to initiate executable operations. The executable operations include generating an output tile of a first layer of the neural network by processing an input tile of the first layer and storing the output tile of the first layer in the internal memory. The executable operations also include generating an output tile of a next layer of the neural network by processing the output tile of the first layer stored in the internal memory.

Another embodiment includes a computer program product having a computer readable storage medium having program code stored thereon for executing a neural network. The program code is executable by a processor to perform operations. The operations include generating an output tile of a first layer of the neural network by processing an input tile to the first layer and storing the output tile of the first layer in an internal memory of a processor. The executable operations also include generating, using the processor, an output tile of a second layer of the neural network by processing the output tile of the first layer stored in the internal memory.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

FIG. 3 is a block diagram illustrating an example partitioning for a neural network with overlapping tiles.

FIGS. 4-1 and 4-2 are block diagrams illustrating further example partitionings for a neural network.

DETAILED DESCRIPTION

Figure 1:
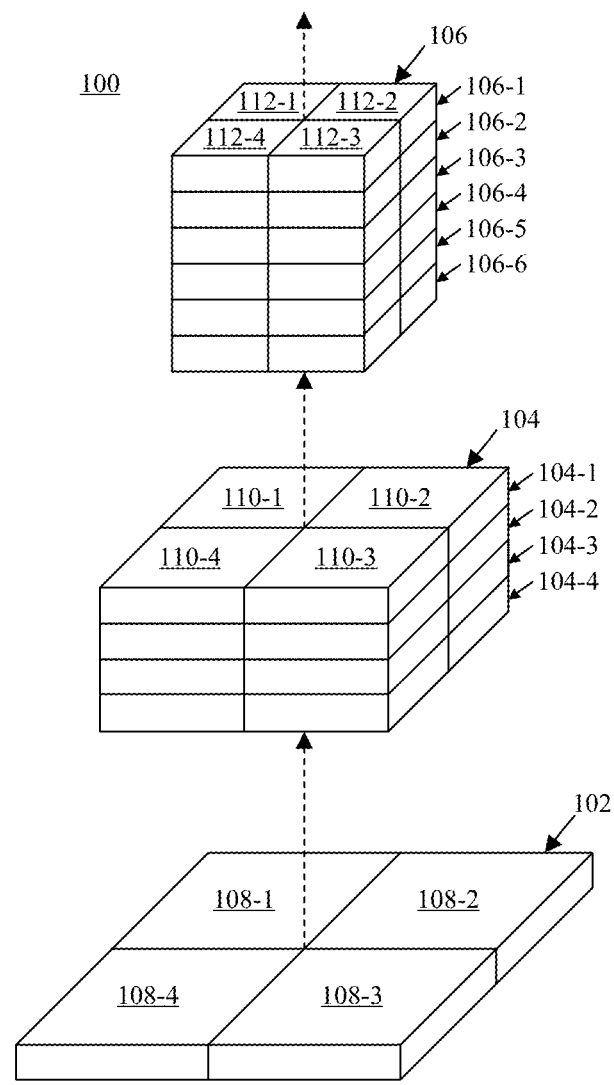
FIG. 1 is a diagram illustrating example processing by a plurality of layers of a neural network.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to neural networks. More particularly, example embodiments disclosed herein relate to reducing memory access and in-network bandwidth consumption of a neural network during execution. In accordance with example arrangements disclosed herein, methods and systems for executing a neural network are provided. The example embodiments described herein can facilitate efficient use of internal memory and reduce the amount of data accesses to external memory or high-level cache memory performed during execution of the neural network.

Example embodiments disclosed herein can, for example, reduce, eliminate all, or eliminate nearly all data traffic and associated storage for intermediate results during forward execution of a neural network. Example embodiments relate to the execution of one or more stages of a neural network. For instance, execution of feature extraction layers (e.g., convolution layers) is described in connection with FIGS. 1-6. Additionally or alternatively, example embodiments can eliminate a number of (e.g., all or nearly all) parameter reads from external memory and parameter writes to external memory associated with execution of fully-connected layers of the neural network, as described in greater detail in connection with FIGS. 7 and 8. The term "fully-connected layers," as used herein, means the feature classification layers of the neural network.

The data traffic to execute the neural network is reduced thereby improving performance and reducing the power required to determine the same computation results, e.g., without approximations. By reducing the number of data reads and writes of intermediate results and/or weights of the feature classification layers to external memory, example embodiments described herein can facilitate increased execution speed, reduced power consumption, and reduced memory storage load.

Convolutional neural networks can be deployed for a number of applications including, but not limited to, object recognition in images, image reconstruction, semantic segmentation, scene recognition, etc. Object recognition refers to image processing that detects or recognizes particular objects such as cats, cars, chairs, and so forth within images. Image reconstruction refers to image processing that attempts to correct images. An example of image reconstruction may include sharpening a blurry image. Semantic segmentation refers to image processing that labels parts of an image. Scene recognition refers to image processing that determines a particular scene such as an office, bedroom, stadium, etc., represented in an image. Beyond these visual examples, there are many other application domains where similar neural networks are effectively applied.

While neural networks can achieve remarkable precision (accuracy), neural networks can be compute-intensive. For example, a neural network often performs a large number of operations per image, requires a large number of weights to execute, and generates a large amount of intermediate results traffic. In illustration, a typical neural network may perform on the order of gigaops per image, utilize 100s of millions to billions of weights, and generate 100s of gigabytes of intermediate results data. In a number of implementations, weight and intermediate result data traffic have a high cost in terms of power efficiency. As computational efficiency of a neural network improves, this traffic constitutes an even larger proportion of the power expended to execute the neural network, thereby limiting use of neural networks in power-constrained mobile devices and other power-limited applications and/or computing environments. Accordingly, example embodiments disclosed herein can facilitate deploying neural networks and neural network based application(s) on a mobile electronic device.

FIG. 1 is a diagram illustrating example processing by a plurality of layers of a neural network 100. FIG. 1 shows an input 102 and a plurality of feature map sets 104 and 106. Input 102, for example, may be an image that is to be processed through neural network 100. The term "feature map set," as used herein, means one or more feature maps, e.g., data. A feature map set is received as input and processed by a layer of a neural network and/or is generated as output by a layer of a neural network. In an example embodiment, feature map sets 104 and 106 are generated by feature extraction layers, or convolution layers, of neural network 100.

In general, a layer of neural network 100 can define a mapping of inputs to outputs. In the case of a convolutional neural network, for example, the mapping defined by a layer is implemented as one or more convolution kernels that are to be applied to input data such as an image and/or specific feature maps to generate further feature maps as output from the layer. Referring to FIG. 1, a layer (not shown) receives input 102 during forward execution and generates feature map set 104 as output. A next layer (not shown) receives feature map set 104 as input during forward execution and generates feature map set 106 as output. A further layer may receive feature map set 106 as input during forward execution and generate a further feature map set as output. Thus, data flows upwards from input 102 to feature map set 104, to feature map set 106 during forward execution. One or more or all of the layers that receive and/or generate feature map sets 104 and 106 may be hidden layers, e.g., hidden convolutional layers. Other processing operations may be performed in addition to applying convolution kernels to map input feature maps to output feature maps. Examples of these processing operations may include, but are not limited to, application of an activation function, pooling, and resampling.

In the example of FIG. 1, feature map set 104 includes four feature maps 104-1, 104-2, 104-3, and 104-4. Feature map set 106 includes six feature maps 106-1, 106-2, 106-3, 106-4, 106-5, and 106-6. It should be appreciated that the number of feature maps shown in each of feature map sets 104 and 106 is for purposes of illustration. The example arrangements described within this disclosure are not intended to be limited by the particular number of feature maps in any of the feature map sets of neural network 100 and/or by the particular number of layers in neural network 100.

The term "intermediate data" refers to data of the feature maps generated by hidden convolution layers, e.g., layers 1 to N−1, of a neural network. A neural network engine (NN engine), for example, generates intermediate data during execution of a neural network such as neural network 100.

In general, each feature map set 104-106 can be composed of 10s to 100s of feature maps. In one example, each feature map is a 2D image map of 16-bit values representing the strength of a learned feature at all x, y locations. To generate each feature map for a layer N+1 of the neural network, an NN engine reads each feature map output by layer N of the neural network. For example, if layer N generates 10 feature maps as input to layer N+1, which generates 20 feature maps as output, each feature map in layer N must be read 20 times in executing layer N+1. Thus, the NN engine must perform a total of 200 feature map reads from layer N.

In one arrangement, an NN engine may use parallelism to reorder computations so that intermediate data are consumed soon after the intermediate data are produced. By consuming intermediate data soon after production, only a small amount of intermediate data is stored at any one time. The small amount of intermediate data may fit in nearby on-die storage, e.g., an internal memory, instead of storing the intermediate data in an external random access memory (RAM) or other distant cache memory. Also, in an example embodiment, little, if any, of the intermediate data is moved any significant distance inside the NN engine itself. The same local set of multiply accumulate (MAC) units that generate the intermediate data may be used to consume the intermediate data as input soon after generation. This further reduces power since long interconnects within the NN engine are not required to transport the intermediate data.

In another example embodiment, the NN engine may be configured to reorder computations to reduce and/or eliminate and localize the intermediate data by interleaving the generation of one or more or potentially all of the convolution layers of the neural network. This is in contrast to executing all of a layer to generate feature map set 104, then all of a next layer to generate feature map set 106, and so forth. Instead, in accordance with example arrangements described herein, the NN engine may execute a portion of a layer to generate a portion of feature map set 104, then a portion of a next layer to generate feature map set 106, and so on. For example, the NN engine may generate tile 110-1 in feature map set 104, followed by corresponding tile 112-1 of feature map set 106, etc. The NN engine may then generate tile 110-2, followed by tile 112-2, and so on.

For purposes of illustration, neural network 100 of FIG. 1 may be visualized as a pyramid of layers. As noted, execution may start at the bottom of the pyramid by processing input 102 to generate feature map set 104 having tiles 110 and to process feature map set 104 to generate feature map set 106 having tiles 112. As neural network 100 is traversed upwards, each next higher layer may shrink in terms of x-y dimensions while the number of feature maps for the layer may increase. The x-y dimensions of the layer that generates feature map set 106, for example, may be smaller than the x-y dimensions of the layer that generates feature map set 104. Feature map set 106 has more feature maps than feature map set 104. In other cases, the number of feature maps in a next higher layer of a neural network may remain the same.

In accordance with another example embodiment, the 3D volume of neural network 100 may be conceptually diced up, or partitioned, into a plurality of rectangular frustums. Each rectangular frustum may have a rectangular intersection, defining a tile, with each feature map set and/or input used by neural network 100. In this regard, a tile is a rectangular portion of a feature map set or input data to a neural network. In the example of FIG. 1, neural network 100 is divided into four frustums referred to as frustums 1, 2, 3, and 4. The rectangular tiles are defined by the intersection of the frustums with input 102 and each of feature map sets 104 and 106 of neural network 100. Accordingly, each tile of a given feature map set includes a portion of each feature map of that feature map set. For example, tile 110-1 includes the top-left portion of each of feature maps 104-1, 104-2, 104-3, and 104-4. For purposes of discussion, the extended portion of the reference number of each tile of a feature map set indicates the particular frustum to which the tile belongs. For example, frustum 1 may include tile 108-1 of input 102, tile 110-1 of feature map set 104, and tile 112-1 of feature map set 106. Frustum 2 may include tile 108-2 of input 102, tile 110-2 of feature map set 104, and tile 112-2 of feature map set 106, etc. Since a layer defines a mapping of inputs to outputs using convolution kernels, it should be appreciated that each frustum also defines particular ones of the convolution kernels in each layer that operate on input tiles and generate output tiles. An example method for partitioning is described in greater detail in connection with FIG. 6.

As used herein, an example of "executing a layer" and of "processing data" using a layer of a neural network (e.g., by using a device such as a processor, compute unit, NN engine, etc.) include "applying the convolution kernels of the layer of the neural network to the data provided as input to the layer to generate an output feature map set of the layer." The data may be a feature map, a feature map set, or another input such as one or more images. In this regard, it should be appreciated that a portion of a neural network may be executed to process a tile. As used herein, an example of "processing a tile" using a layer of a neural network includes "applying a subset of the convolution kernels of the layer of the neural network that correspond to the tile provided as input to the layer to generate an output tile for the layer." For example, the convolution kernels of a layer within a frustum defining the tile provided as input may be applied to the input tile to generate the output tile.

In general, the processing within each frustum may be performed independently of each other frustum. In one example embodiment, a small amount of data may be shared between adjacent frustums. Further, for a given tile of a layer, all feature map portions necessary to generate the corresponding tile of the next layer may be stored in buffering local to the particular logic circuitry that produces the corresponding tile in the next layer. As defined within this disclosure, the term "corresponding tile" refers to a tile in a same frustum and in an adjacent layer of a neural network as a reference or subject tile.

For example, for a tile of a given layer of neural network 100, the portions of the feature maps consumed by, and generated by, the processor of the NN engine may be stored in an internal memory that is on-die with the processor. The portions of the feature maps generated by the processor for a tile are used to generate an output tile that is provided as input to the next layer. In illustration, the processor may consume portions of input 102, e.g., tile 108-1, stored in internal memory to generate corresponding tile 110-1 of feature map set 104. Tile 110-1 of feature map set 104 may also be stored in the internal memory. The processor may then utilize tile 110-1 of feature map set 104 in internal memory to generate tile 112-1 of feature map set 106. Tile 112-1 may also be stored in internal memory. In one aspect, the total storage required for the internal memory to process a frustum is the maximum footprint (e.g., memory usage) of corresponding tiles of the frustum in two adjacent layers of neural network 100. For example, data corresponding to tile 112-1 may overwrite data for tile 108-1. It should be appreciated that the x and y dimensions of the tiles, e.g., frustum size, may be reduced as needed to guarantee that the intermediate results fit in the available internal memory.

For each frustum of neural network 100, the NN engine may generate portions of the feature maps defined by a tile for layer N+1 from the portions of the feature maps defined by the corresponding tile of layer N. In one embodiment, the NN engine may perform the necessary processing in any of a variety of different orders while maintaining all needed data in the internal memory or buffering. For example, the NN engine may generate portions of each output feature map for a tile in layer N+1 by reading and convolving all of the input feature maps defined by the corresponding tile of layer N and adding the results. After generating the corresponding tile of layer N+1, the data for the tile of layer N used to generate the tile of layer N+1 is no longer needed. Accordingly, the NN engine may recycle, delete, free, or overwrite the memory used to store the tile of layer N in order to store results (e.g., the corresponding tile) for layer N+2, and so on. The NN engine may continue to overwrite the intermediate data for a layer as newly generated intermediate data of next layers is generated as described. An example method is described in greater detail in connection with FIG. 5.

By dividing the neural network into frustums that may be handled independently of one another, the NN engine may process frustums in parallel using a plurality of compute units. For example, one compute unit of the NN engine may process tiles 108-1, 110-1, and 112-1; while concurrently another compute unit of the NN engine may process tiles 108-2, 110-2, and 112-2; while concurrently another compute unit of the NN engine may process tiles 108-3, 110-3, and 112-3, while concurrently still another compute unit of the NN engine may process tiles 108-4, 110-4, and 112-4. Parallel processing is described in greater detail in connection with FIG. 4.

In some cases, some data, e.g., very little data, is used by tiles immediately adjacent within a same feature map set. Accordingly, while frustums may be processed independently, a small portion of the intermediate data may be shared along boundaries of adjacent tiles within a same feature map set as processed by a layer of the neural network. For example, a small portion of the data generated for tile 110-1 of feature map set 104 may be shared with tile 110-2 of feature map set 104. Since the processing is uniform within each frustum with the same number of calculations being performed and data being held internally, processing time can be predictable. Thus, synchronization among tiles can be simple to control without any significant stalls. In example embodiments, compute units will naturally complete processing of an input tile at substantially the same time as the compute units operating on immediately adjacent input tiles, at which point data at the edges of the adjacent tiles can be exchanged. In another example embodiment, synchronization and data exchange can be implemented at a finer grain on a feature map by feature map basis. This frustum-based method of neural network traversal makes efficient scaling of the architecture straightforward and efficient.

In another example embodiment, data sharing between adjacent tiles may be eliminated by defining the tiles to overlap one another at tile boundaries. In that case, the NN engine may generate data for tiles, including the boundary regions of the tiles, one time per tile. Accordingly, in the case of overlapping tiles, data for two adjacent tiles need not be shared. An example of overlapping tiles is described in greater detail in connection with FIG. 3.

Figure 2:
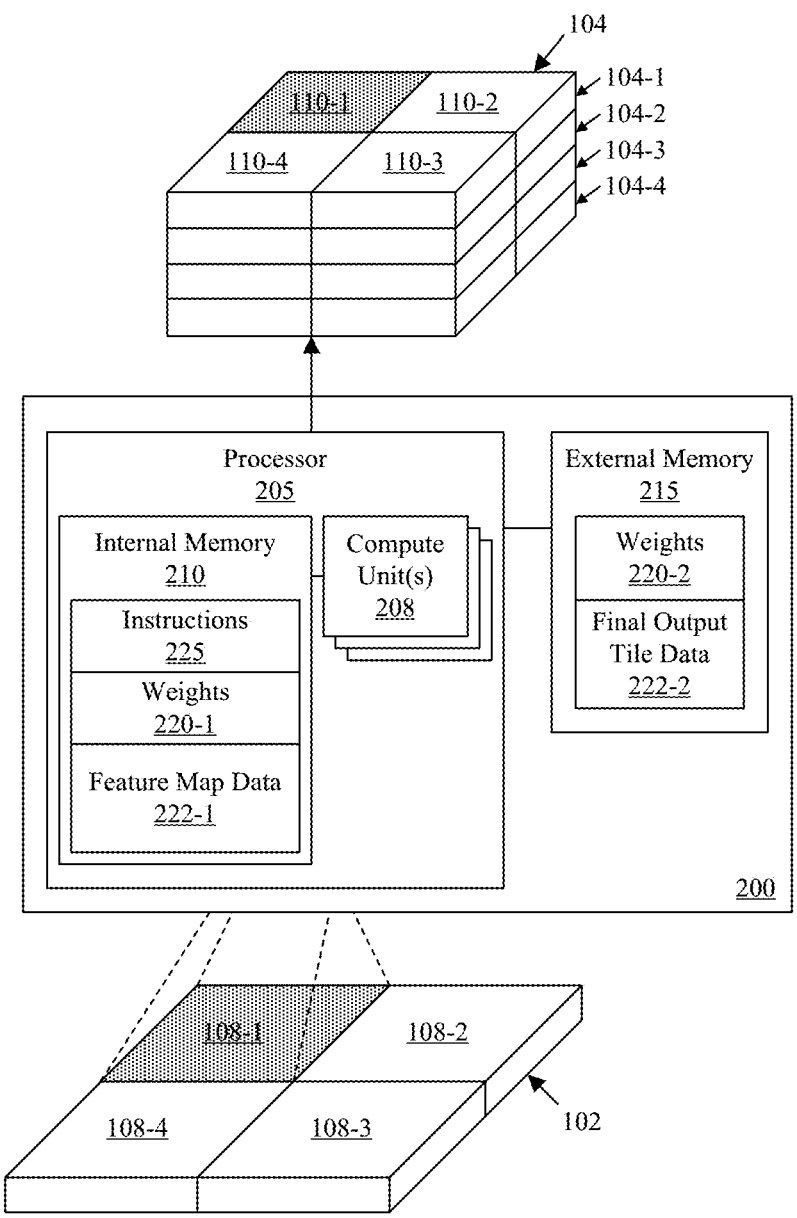
FIG. 2 is a block diagram illustrating processing performed by an example neural network engine.

FIG. 2 is a block diagram illustrating processing performed by an example NN engine 200. As pictured, NN engine 200 may include a processor 205 and an external memory 215. Processor 205 may include one or more compute units 208. In the case where processor 205 includes more than one compute unit 208, compute units 208 may be configured to operate in parallel or concurrently with one another. Further, compute units 208 may operate independently of one another. In one example, each compute unit 208 may be implemented as a core that may execute instructions.

Processor 205 may be implemented as one or more hardware circuits. For example, processor 205 may be implemented as an integrated circuit. In one example embodiment, processor 205 may be configured to carry out instructions such as instructions 225. Instructions 225 may be contained in program code. Example implementations of processor 205 may include, but are not limited to, a central processing unit (CPU), a multi-core CPU, an array processor, a vector processor, a digital signal processor (DSP), a field-programmable gate array (FPGA), a programmable logic array (PLA), an application specific integrated circuit (ASIC), programmable logic circuitry, a controller, a graphics processing unit (GPU), etc. NN engine 200 may be implemented using any of a variety of different processors as described in combination with external memory 215.

Processor 205 may include an internal memory 210. Internal memory 210 may be an on-die memory. For example, internal memory 210 may be a cache memory of processor 205. Internal memory 210 may be implemented as a simple buffer, a level 1 cache memory, a level 2 cache memory, or other type of on-die memory of processor 205. As pictured, compute units 208 may be coupled to internal memory 210. In an arrangement where processor 205 includes a plurality of compute units 208, each compute unit 208 may have a dedicated internal memory 210. Internal memory 210, or each internal memory as the case may be, may store feature maps and/or portions thereof as feature map data 222-1, weights 220-1, and instructions 225.

As pictured, processor 205 may be coupled to external memory 215. In one example, external memory 215 may be implemented as one or more further levels of cache memory for processor 205. External memory 215, however, may not be located on a same die as processor 205. In another example, external memory 215 may be implemented as a RAM, e.g., a DRAM, an SRAM, or other memory. In another example, processor 205 may be coupled to external memory 215 through a memory controller (not shown).

In one example embodiment, external memory 215 stores weights 220-2 for neurons of the neural network not currently in use. External memory 215 can also store final output tile data 222-2. Thus, while memory 215 stores weights 220-2, weights 220-1 may be stored in internal memory 210. For example, weights 220-1 are those weights needed for processing an input tile to a current layer of neural network 100 to generate an output tile for the current layer of neural network 100 to be used as input for the next layer. In the example of FIG. 2, weights 220-1 are the weights needed to process tile 108-1 of input 102 to generate tile 110-1 of feature map set 104 as output. Weights 220-2 are the other weights of neural network 100 not currently in use or needed to process tile 108-1. In another example embodiment, processor 205 may compress weights 220-1 for storage in internal memory 210.

In another example embodiment where processor 205 includes a plurality of compute units with each compute unit having its own internal memory, weights can be loaded one time per layer. When processing the same feature maps, each compute unit uses the same weights as the other compute units. The internal memory for each compute unit, for example, may store different weights for the layer of the neural network currently being processed. The portion of internal memory used to store the weights for each compute unit can be shared with each other compute unit. The internal memory for each compute unit can be accessed by the other compute units to share weights stored therein for processing a tile.

Figures 1, 3, 4:
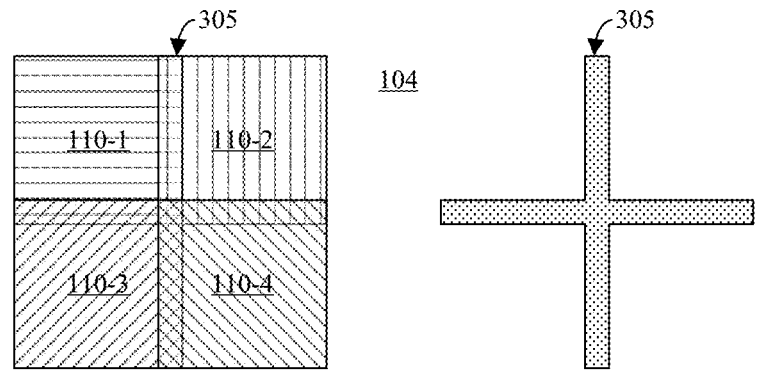
Figure 4:
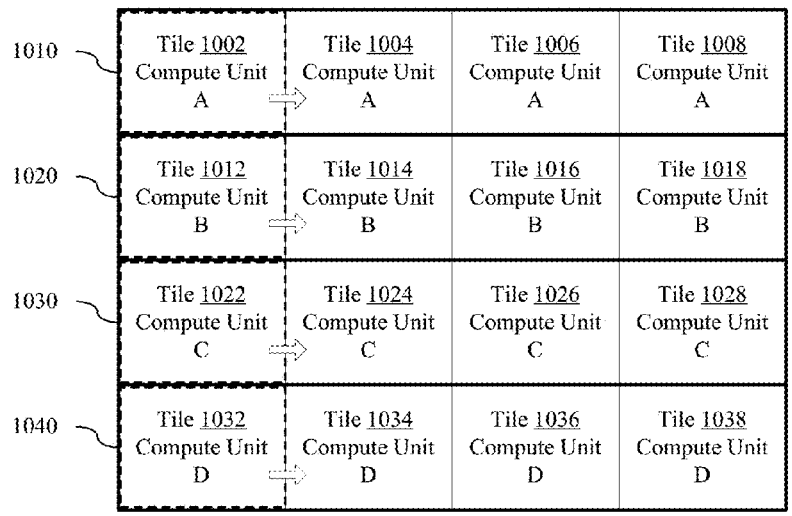
Figure 2:
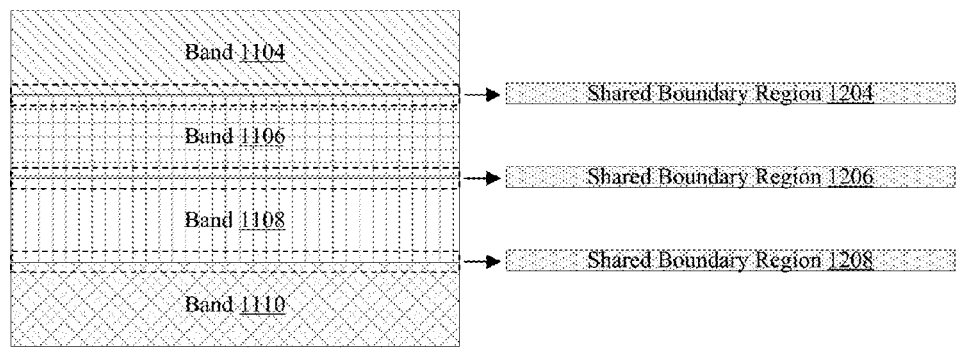

FIG. 3 is a block diagram illustrating an example partitioning for a neural network with overlapping tiles. More particularly, FIG. 3 illustrates feature map set 104 of neural network 100 implemented using overlapping tiles. As pictured, tiles 110-1, 110-2, 110-3, and 110-4 are defined to overlap with one another. The overlap region 305 is shaded. Overlap region 305 is also shown in isolation without tiles 110-1, 110-2, 110-3, and 110-4. Defining tiles with overlap, as noted, avoids having to share data between adjacent tiles.

At a coarser level, there may be some number of compute units each processing a broader region of the entire neural network having several frustums. For example, a 4-unit configuration might divide the network in to 4 quadrants, with each quadrant having 16 frustums. In that case, each compute unit can walk across a quadrant assigned to the compute unit from the top-left corner to the bottom-right corner. In another example, the neural network may be divided into a checkerboard of frustums.

FIGS. 4-1 and 4-2 are block diagrams illustrating further example partitionings for a neural network. Within the examples of FIGS. 4-1 and 4-2, the tiles do not overlap. Referring to FIG. 4-1, feature map set 402 is partitioned to include 16 tiles shown as tiles 404-434. The NN engine processing feature map set 402 may include a plurality of different compute units or cores as described. For example, the NN engine may include 4 compute units A, B, C, and D. Accordingly, the NN engine may spread work across compute units A, B, C, and D to achieve good scaling with minimal, or at least less, cross traffic for the exchange of data between adjacent tiles.

In the example of FIG. 4-1, section 440 of feature map set 402 may include tiles 404, 406, 408, and 410. The NN engine may process tiles of feature maps of section 440 as input to a next layer of the neural network. Compute unit A may process tile 404. Compute unit B may process tile 406. Compute unit C may process tile 408. Compute unit D may process tile 410. Compute units A, B, C, and D operate concurrently.

Similarly, section 442 includes tiles 412, 414, 416, and 418. The NN engine may process tiles of feature maps of section 442 as input to the next layer of the neural network. Compute unit A may process tile 414. Compute unit B may process tile 412. Compute unit C may process tile 418. Compute unit D may process tile 416. Compute units A, B, C, and D operate concurrently.

Section 444 includes tiles 420, 422, 424, and 426. The NN engine may process the tiles of feature maps of section 444 as input to the next layer of the neural network. Compute unit A may process tile 424. Compute unit B may process tile 426. Compute unit C may process tile 420. Compute unit D may process tile 422. Compute units A, B, C, and D operate concurrently.

Section 446 includes tiles 428, 430, 432, and 434. The NN engine may process the tiles of feature maps of section 446 as input to the next layer of the neural network. Compute unit A may process tile 434. Compute unit B may process tile 432. Compute unit C may process tile 430. Compute unit D may process tile 428. Compute units A, B, C, and D operate concurrently.

In describing processing in FIG. 4-1, the NN engine may process one section, then continue to the corresponding section of the next layer and continue up through one or more other feature extraction layers of the neural network. In other arrangements, the NN engine may operate on section 440, then section 442, and then proceed up to process the corresponding section(s) in the next layer or layers as the case may be before returning to layer 402 to process sections 444 and 446.

It should be appreciated that FIG. 4-1 is provided for purposes of illustration only. In one or more other embodiments, the NN engine can divide the neural network into bands, traverse in row-major order, Z-order, etc. There are other possible coarse level subdivisions and traversals that can be used. One consideration is to reduce data exchange between frustums and/or compute unit. Referring to FIG. 4-1, for example, compute unit B operates on contiguous tiles 406 and 412 from different sections and on contiguous tiles 426 and 432 from different sections. The same is true with regard to compute unit C and contiguous tiles 408 and 420 and contiguous tiles 418 and 430. Compute unit D operates on the contiguous tile formation of tiles 410, 416, 422, and 428.

FIG. 4-2 illustrates another example partitioning of feature map set 402. In the example of FIG. 4-2, feature map set 402 is partitioned into tiles 1002-1008, 1012-1018, 1022-1028, and 1032-1038. Tiles 1002-1008 are in row 1010. Tiles 1012-1018 are in row 1020. Tiles 1022-1028 are in row 1030. Tiles 1032-1038 are in row 1040. Each tile in FIG. 4-2 is also labeled with the particular core of the NN engine that operates on the tile. As pictured, compute unit A operates on each tile of row 1010. Compute unit B operates on each tile of row 1020. Compute unit C operates on each tile of row 1030. Compute unit D operates on each tile of row 1040. The arrows indicate that each compute unit is configured to traverse tiles in a row from left to right. Referring to row 1010, for example, compute unit A processes tile 1002, then processes tile 1004, then processes tile 1006, and then processes tile 1008. Each other compute unit may operate on tiles in the other rows in like manner. Appreciably, tiles may be processed from right to left if so desired.

The order in which tiles are processed, or traversed, may be determined by bands. As defined herein, the term "band" means a set of two or more contiguous tiles in a same row or a same column. In one example embodiment, a band is each contiguous tile of a row or a column. The traversal of tiles on a row basis from left to right illustrates an example of horizontal, or row-based, bands. In one example, each row may be a band where row 1010 corresponds to band 1104; row 1020 corresponds to band 1106; row 1030 corresponds to band 1108; and row 1040 corresponds to band 1110. FIG. 4-2 illustrates an example implementation where each band is formed by one row. In other examples, however, each band may be formed of 2 rows, 3 rows, 4 rows, or more.

Organization and traversal of tiles in bands provides several advantages in the case of non-overlapping tiles. In one aspect, in moving from one tile of a band to the next adjacent tile in the same band, there is no need to exchange data between compute units at the boundary of the two tiles. For example, compute unit A processes tile 1002 and tile 1004 next after tile 1002. As such, there is no need to exchange data with a different compute unit in order to process the shared boundary or edge between tile 1002 and tile 1004.

In another aspect, the exchange of data between compute units A, B, C, and D is facilitated due to the compute units completing operation on adjacent tiles of different bands (e.g., tiles in a same column as pictured in FIG. 4-2) at approximately the same time. For example, band 1104 and band 1106 have a shared boundary region 1204. If compute unit A processes band 1104 and compute unit B processes band 1106, compute units A and B share data in order to process shared boundary region 1204. Compute unit A processes tile 1002 concurrently with compute unit B processing tile 1012. Compute units A and B finish processing tiles 1002 and 1012, respectively, at approximately the same time thereby allowing compute units A and B to more easily share data for that portion of shared boundary region 1204 (the shared edge between tiles 1002 and 1012). Compute units A and B may then move on to tiles 1004 and 1014, respectively, process tiles 1004 and 1014 concurrently, share data, and continue down each respective band.

Similarly, band 1106 and band 1108 have a shared boundary region 1206. If compute unit B processes band 1106 and compute unit C processes band 1108, compute units B and C share data in order to process shared boundary region 1206. Compute unit B processes tile 1012 concurrently with compute unit C processing tile 1022. Compute units B and C finish processing tiles 1012 and 1022, respectively, at approximately the same time thereby allowing compute units B and C to more easily share data for that portion of shared boundary region 1206 (the shared edge between tiles 1012 and 1022). Compute units B and C may then move on to tiles 1014 and 1024, respectively, process tiles 1014 and 1024 concurrently, share data, and continue down each respective band.

Finally, band 1108 and band 1110 have a shared boundary region 1208. If compute unit C processes band 1108 and compute unit D processes band 1110, compute units C and D share data in order to process shared boundary region 1208. Compute unit C processes tile 1022 concurrently with compute unit C processing tile 1032. Compute units C and D finish processing tiles 1022 and 1032, respectively, at approximately the same time thereby allowing compute units C and D to more easily share data for that portion of shared boundary region 1208 (the shared edge between tiles 1022 and 1032). Compute units C and D may then move on to tiles 1024 and 1034, respectively, process tiles 1024 and 1034 concurrently, share data, and continue down each respective band.

While FIG. 4-2 is generally described with bands being formed of one or more rows of tiles, it should be appreciated that bands may be formed as one or more columns of tiles. For example, a first band may be formed of tiles 1002, 1012, 1022, and 1032, with a second band being formed of tiles 1004, 1014, 1024, and 1034, and so on. In that case, each compute unit may start at a top (or bottom) of a band and process tiles moving from the top (or bottom) to the bottom (or top) of the band. Each band may also be formed of 2 column, 3 columns, 4 columns, or more.

Figure 5:
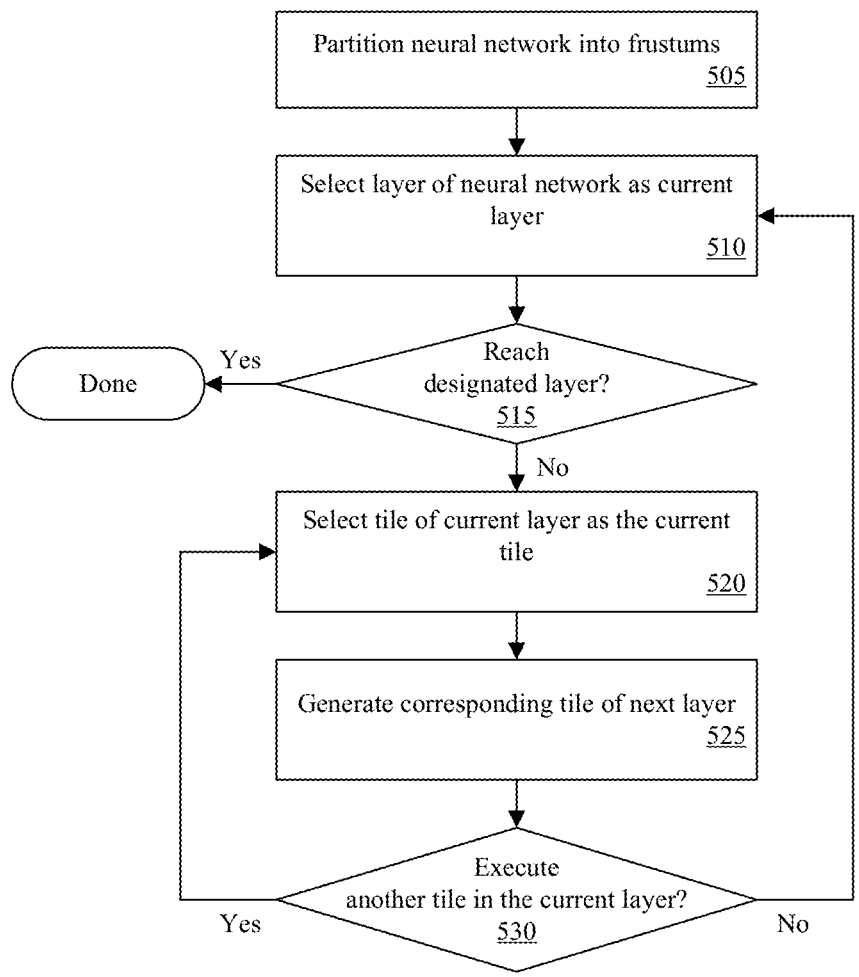
FIG. 5 is a flow chart illustrating an example method of executing a neural network.

FIG. 5 is a flow chart illustrating an example method 500 of executing a neural network. More particularly, method 500 illustrates an example method of executing feature extraction layers of a neural network. With the exception of block 505, method 500 may be performed by an NN engine as described with reference to FIG. 2.

In block 505, the neural network may be partitioned into a plurality of frustums. The frustums may be rectangular. The neural network may be divided into rectangular frustums projecting from the higher layers of the neural network to the lower layers. In one embodiment, the neural network is partitioned into frustums using an offline process as performed by a data processing system. The partitioned neural network may be stored in a memory with the partitioning, e.g., as a data structure or part of a data structure, so that the NN engine and/or another system may read and/or determine the partitioning upon executing the neural network.

A system, for example, may partition the neural network according to a size of an internal memory for the processor of the neural network. The system may size the frustums according to an amount of memory internally available to the processor for storing weights to process tiles of one layer for generation of tiles for the next layer, tiles of feature maps in adjacent layers, and instructions. An example method of implementing block 505 is described in connection with FIG. 6.

In block 510, the NN engine may select a layer of the neural network as the current layer. For example, the NN engine may select layer N as the current layer. In block 515, the NN engine may determine whether the current layer is one designated as a stopping point for performing the execution method illustrated in FIG. 5. If so, in one aspect, method 500 may end. In another aspect, method 500 may be started anew at a selected layer of the neural network.

For example, the NN engine, in block 515, may determine that a particular layer of the neural network has been reached. In response, the NN engine may start processing from a beginning layer if further tiles remain to be processed as input to the beginning layer (e.g., at least one other frustum of the neural network requires processing) or end. If a designated layer is not reached, method 500 may continue to block 520.

In block 520, the NN engine may select a tile as input to the current layer as the current tile. In block 525, the NN engine may generate a corresponding tile of the next, or adjacent, layer of the neural network for the current tile. For example, the neural network engine processes the selected tile as an input tile to generate an output tile (e.g., a corresponding tile). In block 530, the system determines whether to process another tile of the input object (image or feature map set) to the current layer or to continue to the next layer in the neural network. Responsive to determining that a different, or next, tile of the input object is to be processed, method 500 loops back to block 520 to select the next tile of the input object. Responsive to determining that a corresponding tile in a next layer of the neural network is to be processed, method 500 loops back to block 510 to select the next adjacent layer in the neural network. For example, the tile selected in a next iteration of block 520 can be the output tile generated in the previous iteration of block 520.

In one embodiment, depending upon the partitioning, bands, the number of compute units in the NN engine, the size of the internal memory, and so forth, the NN engine may process another tile in the current layer. For example, the NN engine may process only a subset of tiles, e.g., 1 or more but fewer than all tiles, as inputs to the current layer. The NN engine may continue to the next layer of the neural network prior to processing all tiles in the prior layer. As discussed, intermediate data generated by processing the input tiles to the current layer may be stored in internal memory and used for the next layer, e.g., as input tiles for generating output tiles in the next layer.

In another embodiment, method 500 may be performed by a first compute unit of the NN engine, while one or more other compute units of the NN engine also implement method 500 of FIG. 5 concurrently with the first compute unit. The compute units may also operate in a synchronized manner so that data at the edges of contiguous tiles in a same feature map set being processed by the compute units operating concurrently may be shared. Alternatively, tiles may be defined in an overlapping manner to avoid sharing of data between compute units.

In another embodiment, method 500 may be performed to process a first frustum of the neural network through a first plurality of adjacent layers. Method 500 may iterate to process each other frustum through the first plurality of adjacent layers. Method 500 may then be implemented again to process a first frustum of a second and different plurality of adjacent layers having a different partitioning than the first plurality of adjacent layers. Method 500 may be repeated to process the remaining frustums through the second plurality of adjacent layers with the different partitioning.

Figure 6:
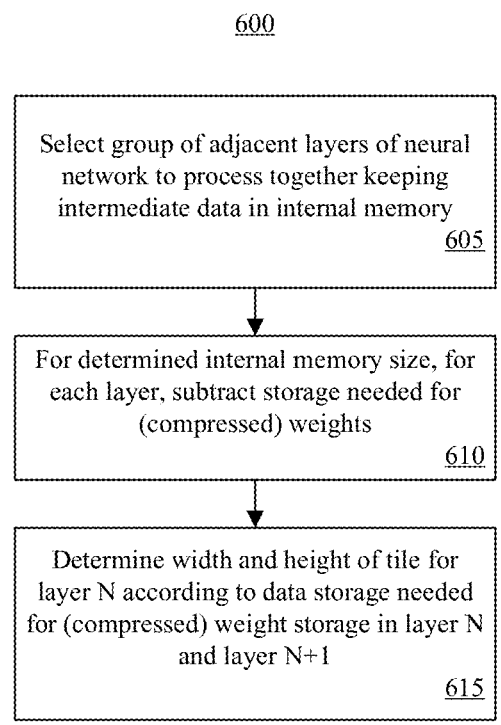
FIG. 6 is a flow chart illustrating an example method of determining frustums for a neural network.

FIG. 6 is a flow chart illustrating an example method 600 of determining frustums for a neural network. Method 600 may be performed to partition the neural network into frustums, which define the size of the tiles of each respective feature extraction layer of the neural network. In one aspect, method 600 may be an example implementation of block 505 of FIG. 5. In one embodiment, method 600 may be implemented by a data processing system (system) such as a computer. For example, method 600 may be performed as an offline process in that method 600 may be performed prior to execution of the neural network. The partitioning determined may be stored as part of the neural network for later execution by an NN engine.

In block 605, the system may select a group of adjacent feature extraction layers of the neural network to process together keeping intermediate data in an internal memory of the processor of the NN engine. For example, the system may select two adjacent feature extraction layers. As discussed, keeping intermediate data in an internal memory of the processor of the NN engine reduces the off-chip data traffic generated in executing the neural network.

In block 610, the system may subtract the storage needed for storing compressed weights in the group from the determined internal memory size. The amount of memory required to store compressed weights for each layer of the neural network can be determined from the training process performed prior to partitioning. In block 615, the system may determine the width and the height of the tiles based upon the storage required for the number of feature maps in layer N of the group plus the corresponding storage requirement for the next layer (layer N+1) of the group. The storage required for layer N+1 is the product of the scaled width and height and the number of feature maps in layer N+1. The width and height are scaled from layer N and account for additional neurons at the tile boundaries for the convolution kernel width and height.

For the group of layers selected in block 605, the system may determine the width and height at any given layer so the portions of feature maps for the tile of two adjacent layers (e.g., corresponding tiles) fit in the remaining storage after the compressed weights are subtracted from the total available storage of the internal memory. Since tile resolution is scaled at each layer, one size would result that would not scale beyond the available storage.

FIG. 6 is presented for purposes of illustration only and, as such, is not intended as a limitation of the inventive arrangements disclosed herein. FIG. 6 illustrates an example process for partitioning a neural network into frustums based upon the size of the internal memory of the NN engine. In one arrangement, FIG. 6 may be performed for different groups of adjacent feature extraction layers in the neural network to determine more than one partitioning of the neural network. In this manner, a portion of the neural network with a plurality of adjacent feature extraction layers may be executed using a first partitioning and a second (or third or more) different portion of the neural network having adjacent feature extraction layers may be executed using a second and different partitioning.

In another aspect, the example embodiments described herein can also address the reduction of parameter data traffic. For instance, parameter data reads can consume a significant portion of the memory bandwidth in the feature classification layers of a neural network. As defined within this specification, the term "parameter" means a weight applied to data read from input feature maps to generate output feature maps in a subsequent layer of the neural network. In this regard, the term "parameter" may be used interchangeably with "weight" within this disclosure. Typically, weights are 8-bits or 16-bits each, through the inventive arrangements are not intended to be limited by the particular bit-width of the parameters. As an illustrative example, a number of convolutional neural networks include millions of weights, thereby generating a large amount of in-network data traffic.

In a number of embodiments, the majority of the weights, e.g., approximately 90%, are for the final feature classification layers of the neural network. As neural networks evolve in the future to classify more categories of objects, for example, or to do more complex tasks, the number of parameters in the feature classification layers should increase, making parameter traffic for executing the networks an even larger problem for power consumption. To mitigate, or nearly eliminate, the cost of parameter traffic, test cases can be processed in batches. For example, 10s or 100s of images might be processed by the network together in some applications.

In a number of cases, neural networks can narrow from the input layer to the output side of the neural network. For example, the neural network may have a set of feature extraction layers followed by a set of fully-connected feature classification layers. The majority of the weights belong to the feature classification layers. The amount of storage needed at the top of the feature extraction layers of the neural network for the intermediate data can be small.

Figure 7:
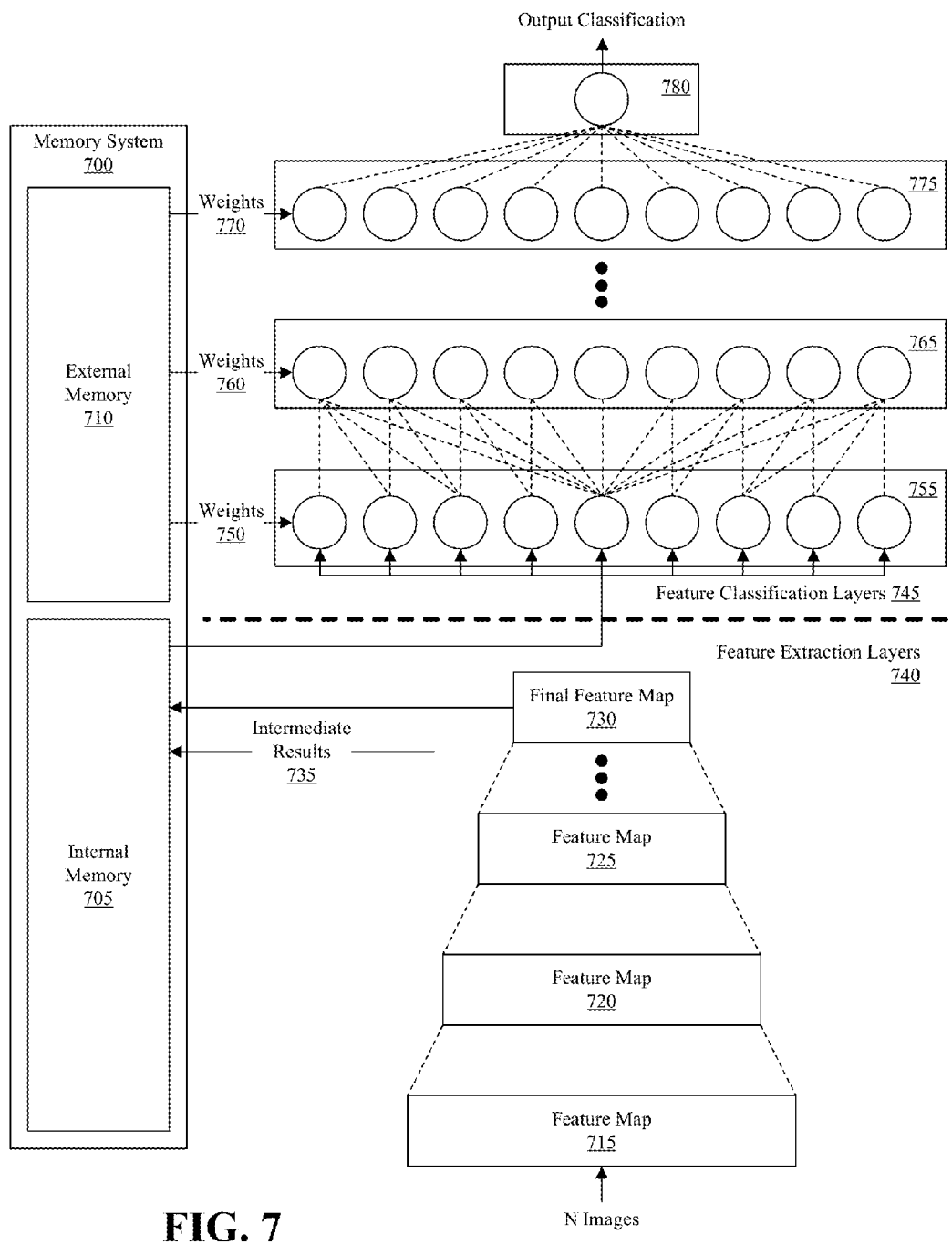
FIG. 7 is a diagram illustrating an example of batch processing for executing a neural network.

FIG. 7 is a diagram illustrating an example of batch processing for executing a neural network. In the example of FIG. 7, a NN engine, e.g., NN engine 200 of FIG. 2, includes a memory system 700. Memory system 700 includes an internal memory 705 that is located on die with the particular processor, logic, compute unit, or the like of the NN engine. Memory system 700 also includes an external, or off-chip, memory 710. External memory 710 may be coupled to the NN engine through a memory controller (not shown). As pictured, the neural network includes a plurality of feature extraction layers 740 and a plurality of feature classification layers 745.

As pictured, the NN engine may process N images through feature extraction layers 740 of the neural network as represented by feature maps 715, 720, 725, and final feature map 730. In this example, N is an integer value greater than one. The NN engine saves intermediate results 735 for each of the N images within internal memory 705.

Progressing on to feature classification layers 745 of the neural network, the NN engine reads a portion or subset of the weights 750 of the first fully-connected feature classification layer 755 and processes each of the intermediate results of the N images through layer 755. The NN engine saves partial results for all N images in the batch to internal memory 705. In some cases, the NN engine may save the partial results of layer 755 for the N images in external memory 710.

For example, if there are 16 million 16-bit parameters for layer 755 and 32 KB of storage for weights 750 in internal memory 705, the NN engine reads a subset of weights 750 into internal memory 705, e.g., 16 K of weights 750, applies the subset of weights 750 to all N images, and adds the contributions for the subset of weights 750 to the intermediate results for the N images stored in internal memory 705. The NN engine then reads the next subset of weights 750, e.g., the next 16 K of weights 750, into internal memory 705, thereby overwriting the first subset of weights 750, and so on.

In this example, this process can be repeated 1,000 times to process all 16 million parameters of layer 755. In this way the cost of reading the 16 million weights is amortized over the N images reducing the related read traffic to (1/N)*(16 million weights*2 bytes/weight). If N=16, the read traffic is 32 MB for the batch instead of 256 MB. The NN engine then performs the described process for weights 760 and layer 765, and again for weights 770 and layer 775. The NN engine performs the final processing for layer 780 for generating the output classification. For example, layer 780 can be implemented as a softmax layer configured to find the class with the maximum probabilities from the fully connected layer output. Consequently, the NN engine reads the weights of each layer of feature classification layers 745 one time for the whole batch of N images rather than one time for each image of the N images. A batch of 16 images processed as described herein with reference to feature classification layers 745 would have 1/16th the number of weight reads for feature classification layers 745 compared to processing each image one by one. If feature classification layers 745 constitute approximately 90% of the weights of the neural network, the example embodiments described within this disclosure save approximately 84% ($^{15}/_{16}$*$^{9}/_{10}$) of the weight traffic for executing the neural network.

Figure 8:
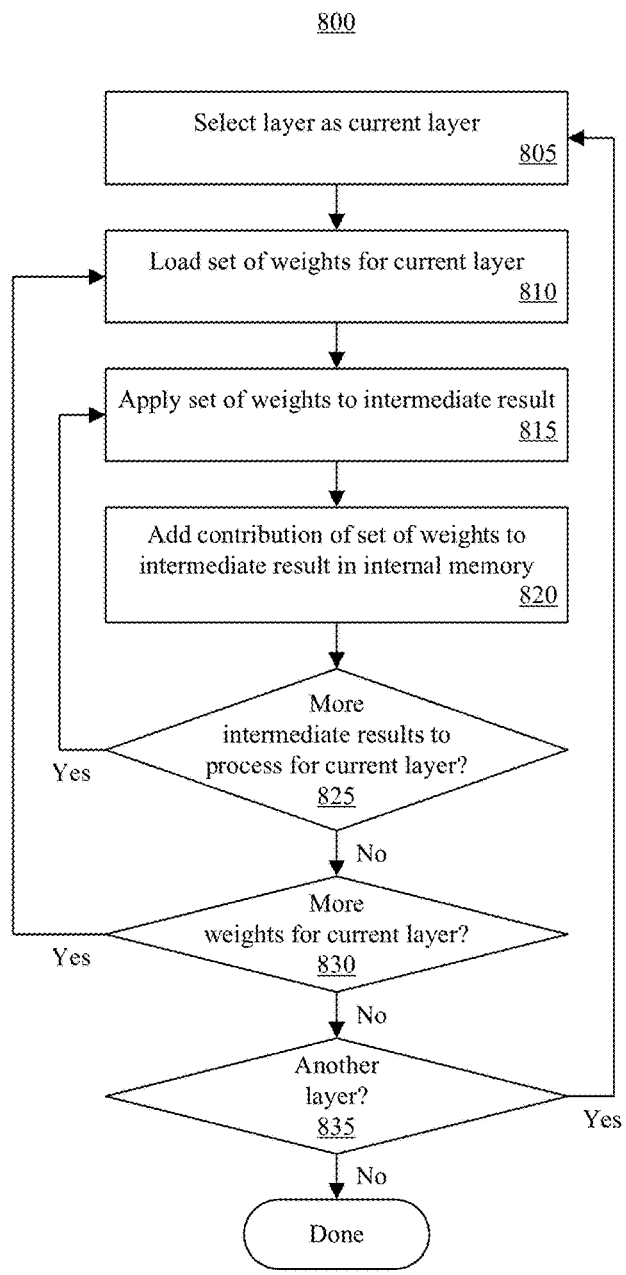
FIG. 8 is a flow chart illustrating an example method of executing a neural network.

FIG. 8 is a flow chart illustrating an example method 800 of executing a neural network. More particularly, FIG. 8 illustrates an example method 800 of executing feature classification layers of a neural network. Method 800 may begin in a state where the NN engine has processed a plurality of images through the feature extraction layers of the neural network as described herein. The feature extraction layers may be executed using partitioning and tiles as described. In one example, method 800 may be performed by an NN engine as described with reference to FIG. 2.

In block 805, the NN engine selects a layer, i.e., a feature classification layer, of the neural network as the current layer for processing. In block 810, the NN engine loads a set of weights for the current layer into internal memory. The weights that are loaded into internal memory may be a subset of the weights for the current layer. Further, the subset of weights loaded for the current layer may be a number of weights that permits the NN engine to store intermediate results for each of the N images within the internal memory with the intermediate results of the N images.

In block 815, the NN engine applies the set of weights loaded in block 810 to an intermediate result for an image of the set of images. In block 820, the NN engine adds the contribution from the set of weights to the intermediate result for the image in internal memory.

In block 825, the NN engine determines whether any further intermediate results of different images of a batch of images being processed through the feature classification layers of the neural network remain to be processed for the current layer. If so, method 800 loops back to block 815 to process the intermediate results for a further image. If not, e.g., all of the images of the batch of images have been processed using the set of weights loaded in block 810, method 800 continues to block 830.

In block 830, the NN engine determines whether there are any additional weights for the current layer to be applied to the images. If so, method 800 loops back to block 810 to load a next set (e.g., a subset) of weights for the current layer. If not, method 800 continues to block 835. In block 835, the NN engine determines whether there are any further layers, e.g., feature classification layers, of the neural network to be executed. If so, method 800 loops back to block 805 to select a next feature classification layer and continue processing. If not, method 800 ends.

Figure 9:
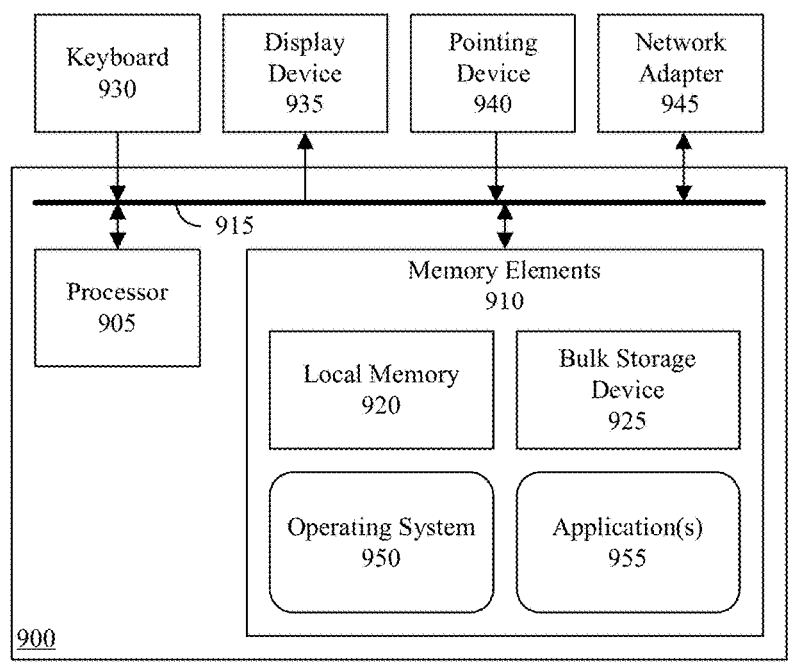
FIG. 9 is a diagram for an example data processing system.

FIG. 9 is a diagram illustrating an example data processing system (system) 900 for determining frustums of a neural network. For example, system 900 is used to implement a partitioning process as described herein with reference to FIG. 6. In another example embodiment, system 900 is used to execute the neural network.

As pictured, system 900 includes at least one processor, e.g., a central processing unit (CPU), 905 coupled to memory elements 910 through a system bus 915 or other suitable circuitry. System 900 stores computer readable instructions (also referred to as "program code") within memory elements 910. Memory elements 910 may be considered an example of computer readable storage media. Processor 905 executes the program code accessed from memory elements 910 via system bus 915. In one example, processor 905 may be implemented as described in connection with FIG. 2.

Memory elements 910 include one or more physical memory devices such as, for example, a local memory 920 and one or more bulk storage devices 925. Local memory 920 refers to RAM or other non-persistent memory device(s) generally used during actual execution of the program code. Bulk storage device 925 may be implemented as a hard disk drive (HDD), solid state drive (SSD), or other persistent data storage device. System 900 may also include one or more cache memories (not shown) that provide temporary storage of at least some program code in order to reduce the number of times program code must be retrieved from bulk storage device 925 during execution.

Input/output (I/O) devices such as a keyboard 930, a display device 935, a pointing device 940, and one or more network adapters 945 may be coupled to system 900. The I/O devices may be coupled to system 900 either directly or through intervening I/O controllers. In some cases, one or more of the I/O devices may be combined as in the case where a touchscreen is used as display device 935. In that case, display device 935 may also implement keyboard 930 and pointing device 940. Network adapter 945 may be used to couple system 900 to other systems, computer systems, remote printers, and/or remote storage devices through intervening private or public networks. Modems, cable modems, Ethernet cards, and wireless transceivers and/or radios are examples of different types of network adapter 945 that may be used with system 900. Depending upon the particular implementation of system 900, the specific type of network adapter, or network adapters as the case may be, will vary.

As pictured in FIG. 9, memory elements 910 may store an operating system 950 and one or more applications 955. Application 955, for example, may be a neural network utility that, when executed, partitions a neural network and/or executes the neural network. For instance, application 955 can include program code that causes the processor 905 to perform one or more of the methods 500, 600, and/or 800. In this way, processor 905 is a special purpose processor for performing the functions defined by the one or more computer programs.

In one aspect, operating system 950 and application 955, being implemented in the form of executable program code, are executed by system 900 and, in particular, by processor 905. As such, operating system 950 and application 955 may be considered an integrated part of system 900. Operating system 950, application 955, and any data items used, generated, and/or operated upon by system 900 are functional data structures that impart functionality when utilized by system 900.

In one aspect, system 900 may be a computer or other device that is suitable for storing and/or executing program code. System 900 may represent any of a variety of computer systems and/or devices that include a processor and memory and that are capable of performing the operations described within this disclosure. Examples of such systems may include mobile devices, smart phones, and/or other portable computing and/or communication devices. In some cases, the particular computer system and/or device may include fewer components or more components than described. System 900 may be implemented as a single system as shown or as a plurality of networked or interconnected systems each having an architecture the same as, or similar to, that of system 900.

In one example, system 900 may receive a neural network as an input. System 900, in executing operating system 950 and application 955, may partition the neural network and store the partitioned neural network within a memory or other computer-readable storage medium for later execution.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the term "executable operation" or "operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment. The terms "embodiment" and "arrangement" are used interchangeably within this disclosure.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a graphics processing unit (GPU), a controller, and so forth.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The corresponding structures, materials, acts, and equivalents of all means or step plus function elements that may be found in the claims below are intended to include any structure, material, or act for performing the function in combination with other claimed elements as specifically claimed.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of executing a neural network by a processor that includes a neural network engine circuit having an internal memory, comprising:
   generating a first output tile of a first layer of the neural network by processing an input tile to the first layer, a size of the first output tile is based at least in part on a size of the internal memory;
   storing the first output tile of the first layer in the internal memory; and
   processing, by the neural network engine circuit, and using the first output tile, a plurality of adjacent layers of the neural network, wherein the plurality of adjacent layers is grouped and partitioned into one or more frustums and a rectangular intersection of the frustums determines at least in part the size of the first output tile;
   generating, using the neural network engine circuit, a second output tile of a second output layer of the frustum of the neural network by processing the first output tile of the first layer stored in the internal memory.

2. The method of claim 1, wherein each tile comprises of a portion of each feature map of a plurality feature maps such that the tile have a three-dimensional profile that includes a height, a width and a number of feature maps.

3. The method of claim 1, wherein the neural network is partitioned into a plurality of frustums, wherein each frustum is processed independently.

4. The method of claim 3, wherein the processor comprises a plurality of compute units that are configured to process the plurality of frustums in parallel.

5. The method of claim 1, wherein the first layer and the second layer are feature extraction layers configured to process a plurality of images to generate a plurality of output feature maps, the method further comprising:
   processing the plurality of output feature maps for the plurality of images through a feature classification layer of the neural network in batch.

6. The method of claim 5, wherein the processing the plurality of output feature maps of the plurality of images through the feature classification layer comprises:
   loading a first plurality of weights of the feature classification layer from an external memory into the internal memory of the processor; and
   processing each of the plurality of output feature maps using the first plurality of weights of the feature classification layer prior to loading, from the external memory, a second plurality of weights of the feature classification layer or weights of a next feature classification layer.

7. The method of claim 6, further comprising:
   responsive to the processing of each of the plurality of output feature maps using the first plurality of weights of the feature classification layer, loading the second plurality of weights of the feature classification layer into the internal memory;
   wherein the second plurality of weights for the feature classification layer overwrite the first plurality of weights for the feature classification layer.

8. An apparatus comprising a processor configured to execute a neural network, the processor comprising:
   an internal memory;
   a first compute unit coupled to the internal memory and configured to perform executable operations including:
   generating a first output tile of a first layer of the neural network by processing an input tile to the first layer, wherein a size of the first output tile is determined at least in part by a size of the internal memory;
   storing the first output tile of the first layer in an internal memory of a processor; and
   processing, by the processor and using the first output tile, a plurality of adjacent layers of the neural network, wherein the plurality of adjacent layers is grouped and partitioned into one or more frustums and wherein a rectangular intersection of the frustums determines at least in part the size of the first output tile;
   generating, using the processor, a second output tile of a second output layer of the frustum of the neural network by processing the first output tile of the first layer stored in the internal memory.

9. The apparatus of claim 8, wherein each tile comprises of a portion of each feature map of a plurality feature maps such that the tile have a three-dimensional profile that includes a height, a width and a number of feature maps.

10. The apparatus of claim 8, wherein the neural network is partitioned into a plurality of frustums, wherein each frustum is processed independently.

11. The apparatus of claim 10, wherein the processor comprises a plurality of compute units that are configured to process the plurality of frustums in parallel.

12. The apparatus of claim 8, wherein the first layer and the second layer are feature extraction layers configured to process a plurality of images to generate a plurality of output feature maps, wherein the first compute unit is configured to initiate executable operations further comprising:
   processing the plurality of output feature maps for the plurality of images through a feature classification layer of the neural network in batch.

13. The apparatus of claim 12, further comprising:
   an external memory coupled to the first compute unit;
   wherein the processing the plurality of output feature maps for the plurality of images through the feature classification layer comprises loading a first plurality of weights of the feature classification layer from the external memory into the internal memory and processing each of the plurality of output feature maps using the first plurality of weights of the feature classification layer prior to loading, from the external memory, a second plurality of weights for the feature classification layer or weights of a next feature classification layer.

14. The apparatus of claim 13, wherein the first compute unit is programmed to initiate executable operations further comprising:
   responsive to the processing of each of the plurality of output feature maps using the first plurality of weights of the feature classification layer, loading the second plurality of weights of the feature classification layer into the internal memory;
   wherein the second plurality of weights for the feature classification layer overwrite the first plurality of weights for the feature classification layer.

15. A computer program product comprising a computer readable storage medium having program code stored thereon for executing a neural network, the program code executable by a processor to perform operations comprising:
   generating a first output tile of a first layer of the neural network by processing an input tile to the first layer, wherein a size of the first output tile is determined at least in part by a size of the internal memory;
   storing the first output tile of the first layer in an internal memory of a processor; and processing, by the processor and using the first output tile, a plurality of adjacent layers of the neural network, wherein the plurality of adjacent layers is grouped and partitioned into at least one frustum and a rectangular intersection of the frustums determines at least in part the size of the first output tile;

generating, using the processor, a second output tile of a second output layer of the frustum of the neural network by processing the first output tile of the first layer stored in the internal memory.

16. The computer program product of claim 15, wherein each tile comprises of a portion of each feature map of a plurality feature maps such that the tile have a three-dimensional profile that includes a height, a width and a number of feature maps.

17. The computer program product of claim 15, wherein the neural network is partitioned into a plurality of frustums, wherein each frustum is processed independently.

18. The computer program product of claim 15, wherein the first layer and the second layer are feature extraction layers configured to process a plurality of images to generate a plurality of output feature maps, wherein the program code is executable by the processor to perform operations further comprising:

processing the plurality of output feature maps for the plurality of images through a feature classification layer of the neural network in batch.

19. The computer program product of claim 18, wherein the processing the plurality of output feature maps of the plurality of images through the feature classification layer comprises:

loading a first plurality of weights of the feature classification layer from an external memory into the internal memory of the processor; and processing each of the plurality of output feature maps using the first plurality of weights of the feature classification layer prior to loading, from the external memory, a second plurality of weights of the feature classification layer or weights of a next feature classification layer.

20. The computer program product of claim 19, wherein the program code is executable by the processor to perform operations further comprising:

responsive to the processing of each of the plurality of output feature maps using the first plurality of weights of the feature classification layer, loading the second plurality of weights of the feature classification layer into the internal memory;

wherein the second plurality of weights for the feature classification layer overwrite the first plurality of weights for the feature classification layer.

* * * * *